(12) United States Patent
Hossain

(10) Patent No.: US 7,177,923 B2
(45) Date of Patent: Feb. 13, 2007

(54) METHODS AND DEVICES FOR SELECTING INTERNET SERVERS

(75) Inventor: Ashfaq Hossain, Berkley Heights, NJ (US)

(73) Assignee: Agere Systems Inc., Allentown, PA (US)

( * ) Notice: Subject to any disclaimer, the term of this patent is extended or adjusted under 35 U.S.C. 154(b) by 632 days.

(21) Appl. No.: 09/804,248

(22) Filed: Mar. 13, 2001

(65) Prior Publication Data

US 2002/0133532 A1    Sep. 19, 2002

(51) Int. Cl.
  *G06F 15/173* (2006.01)
  *G06F 9/46* (2006.01)
  *G06F 15/18* (2006.01)

(52) U.S. Cl. .................. 709/223; 709/224; 718/105; 706/8

(58) Field of Classification Search ............. 706/1–10, 706/8; 709/200–203, 223–224; 718/100, 718/102, 105
See application file for complete search history.

(56) References Cited

U.S. PATENT DOCUMENTS

| | | | | |
|---|---|---|---|---|
| 5,375,070 A | * | 12/1994 | Hershey et al. ............. 709/224 |
| 5,787,235 A | * | 7/1998 | Smith et al. ................... 706/47 |
| 5,939,925 A | * | 8/1999 | Shibata et al. .............. 327/355 |
| 5,974,457 A | * | 10/1999 | Waclawsky et al. ........ 709/224 |
| 6,578,021 B1 | * | 6/2003 | Barillaud ...................... 706/20 |
| 6,721,720 B2 | * | 4/2004 | Skanning et al. ............. 706/46 |
| 2004/0005041 A1 | * | 1/2004 | Azami et al. .......... 379/112.06 |
| 2004/0047289 A1 | * | 3/2004 | Azami et al. ............... 370/230 |

OTHER PUBLICATIONS

Sodan et al. "Hierarchial Fuzzy Configuration of Implementation Strategies". Proceedings of the 1999 ACM Symposium on Applied Computing, 1999, pp. 250-259.*

Andreas Pitsillides et al., Intelligent QoS Routing, Nov. 2000, Department of Computer Science, University of Cyprus, Nicosia, Cyprus, p. 7 of 13.*

Bin Qui, Using a Fuzzy Logic Based Sheduling Algorithm to Provide Smart and Efficient Load-Balancing for Clustered "virtual"Internet Servers, Feb. 2001, CSSE Monash Honours Research Projects 2001, p. 25 of 29.*

* cited by examiner

Primary Examiner—Antony Nguyen-Ba

(57) ABSTRACT

Novel load-balancing methods and devices direct Internet traffic to a "next available" communications server within a group of server based on a set of fuzzy logic rules. The use of fuzzy logic rules allows a next available server to be quickly and accurately selected.

17 Claims, 9 Drawing Sheets

FIG. 2A

RULE 1:

IF RT is LOW AND NAC is LOW AND DT is LOW
THEN
SI is HIGH

RULE 2:

IF RT is LOW AND NAC is LOW AND DT is MEDIUM
THEN
SI is MEDIUM-HIGH

RULE 3:

IF RT is LOW AND NAC is LOW AND DT is HIGH
THEN
SI is MEDIUM-LOW

RULE 4:

IF RT is LOW AND NAC is MEDIUM AND DT is LOW
THEN
SI is HIGH

RULE 5:

IF RT is LOW AND NAC is MEDIUM AND DT is MEDIUM
THEN
SI is MEDIUM-HIGH

RULE 6:

IF RT is LOW AND NAC is MEDIUM AND DT is HIGH
THEN
SI is MEDIUM

RULE 7:

IF RT is LOW AND NAC is HIGH AND DT is LOW
THEN

FIG. 2B

SI is MEDIUM-HIGH

RULE 8:

IF RT is LOW AND NAC is HIGH AND DT is MEDIUM
    THEN
    SI is MEDIUM-LOW

RULE 9:

IF RT is LOW AND NAC is HIGH AND DT is HIGH
    THEN
    SI is LOW

RULE 10:

IF RT is HIGH AND NAC is LOW AND DT is LOW
    THEN
    SI is MEDIUM

RULE 11:

IF RT is HIGH AND NAC is LOW AND DT is MEDIUM
    THEN
    SI is MEDIUM-LOW

RULE 12:

IF RT is HIGH AND NAC is LOW AND DT is HIGH
    THEN
    SI is LOW

RULE 13:

IF RT is HIGH AND NAC is MEDIUM AND DT is LOW
    THEN
    SI is MEDIUM-LOW

RULE 14:

IF RT is HIGH AND NAC is MEDIUM AND DT is MEDIUM

FIG. 2C

THEN
SI is LOW

RULE 15:

IF RT is HIGH AND NAC is MEDIUM AND DT is HIGH
THEN
SI is LOW

RULE 16:

IF RT is HIGH AND NAC is HIGH AND DT is LOW
THEN
SI is LOW

RULE 17:

IF RT is HIGH AND NAC is HIGH AND DT is MEDIUM
THEN
SI is MEDIUM-LOW

RULE 18:

IF RT is HIGH AND NAC is HIGH AND DT is HIGH
THEN
SI is LOW

RULE 19:

IF RT is MEDIUM AND NAC is LOW AND DT is LOW
THEN
SI is MEDIUM-HIGH

RULE 20:

IF RT is MEDIUM AND NAC is LOW AND DT is MEDIUM
THEN
SI is MEDIUM

RULE 21:

FIG. 2D

IF RT is MEDIUM AND NAC is LOW AND DT is HIGH
THEN
SI is LOW

RULE 22:

IF RT is MEDIUM AND NAC is MEDIUM AND DT is LOW
THEN
SI is MEDIUM-HIGH

RULE 23:

IF RT is MEDIUM AND NAC is MEDIUM AND DT is MEDIUM
THEN
SI is MEDIUM

RULE 24:

IF RT is MEDIUM AND NAC is MEDIUM AND DT is HIGH
THEN
SI is LOW

RULE 25:

IF RT is MEDIUM AND NAC is HIGH AND DT is LOW
THEN
SI is MEDIUM

RULE 26:

IF RT is MEDIUM AND NAC is HIGH AND DT is MEDIUM
THEN
SI is MEDIUM-LOW

RULE 27:

IF RT is MEDIUM AND NAC is HIGH AND DT is HIGH
THEN
SI is LOW

Universe Of Discourse For Round Trip Time (RT)

Universe Of Discourse For Number Of Active Conns (NAC)

Universe Of Discourse For Delivered Throughput (DT)

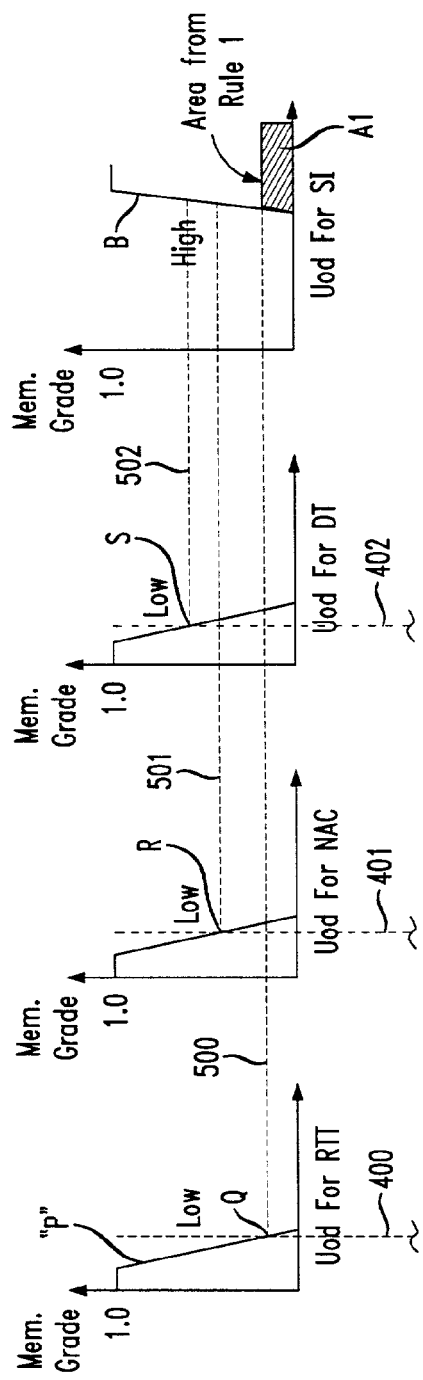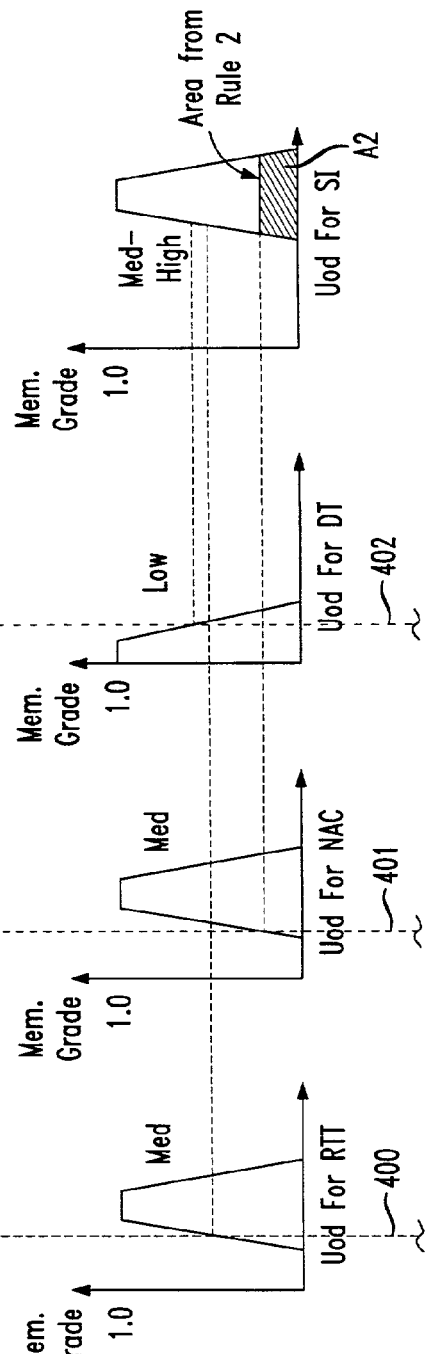
FIG. 6A
FIG. 6B

METHODS AND DEVICES FOR SELECTING INTERNET SERVERS

BACKGROUND OF THE INVENTION

Ever since people began to figure out how to communicate with one another, there has been the problem of what to do when too many people begin to talk at the same time, demanding answers to the same question, from the same person. Banks attempt to solve this problem by requesting all of their clients who have the same basic questions to form one, usually serpentine-like, line. The line ends at a row of tellers each equipped to answer the same basic questions. In a typical Internet communications network, the line is replaced with an electronic device commonly referred to as a "switch" or "router" and the tellers are replaced with other electronic devices called "servers".

Almost all Internet communications (sometimes referred to as "traffic") flows electronically through routers. The Internet is made up of many such routers. It is the job of each router to route traffic to the next "hop" (i.e., destination) which may in fact be another router.

Existing routers can be separated into two types: load balancing routers and non-load balancing routers. A non-load balancing router or switch directs traffic on to the next hop using one of many protocols, most of which allow traffic to be diverted to any router which meets the criteria of the protocol.

Load-balancing routers or switches, on the other hand, are adapted to route traffic to a defined set of "servers" or "next available" server(s). Collectively the defined set of servers is referred to as a "server farm".

How does a load-balancing router determine which server within a server farm to route Internet traffic to? There is no one answer to this question. Generally speaking, a load-balancing router measures the traffic flowing to and from each server which is connected to it. From such measurements the load-balancing router selects the next available server. Up until now, the challenge has been to develop load-balancing routers which act quickly in selecting the next available server but are also capable of making a reliable selection. That is to say, most load-balancing routers available today sacrifice one or the other: they are very reliable but operate too slowly, or operable very quickly but do not select the proper server. More specifically, existing load-balancing routers take too long to make such a determination. So much so that the benefit of selecting the next available server is defeated because of the relatively long amount of time it takes for the router to make such a selection. Conversely, load-balancing routers which operate very quickly in selecting the next available server often fail to select the appropriate server (i.e., one that can be relied upon to handle additional traffic). That is, such routers select the wrong server. By selecting the wrong server, Internet traffic is directed to a server that may quickly become overloaded. Once a server is overloaded, the time it takes to respond to subsequent requests slows down dramatically.

Accordingly, it is desirable to provide for methods and devices which are capable of selecting the next available Internet server from a group of servers.

Other desires will become apparent to those skilled in the art from the following description taken in conjunction with the accompanying drawings and claims.

SUMMARY OF THE INVENTION

In accordance with the present invention, there are provided methods and devices for selecting the next available Internet server using fuzzy logic rules. More specifically, methods and devices are provided that apply fuzzy logic rules to sets of indicators. Each set of indicators is associated with a separate server within a server farm. After the rules are applied, a selection index associated with each set of indicators is generated.

Once a selection index for each server has been generated, the indices are used to direct Internet traffic to a particular server that has a "highest" selection index. Typically this highest selection index indicates that the server is the best server available to handle the very next request received via the Internet (i.e., the "next available" server).

Though a range of indicators and fuzzy logic rules may be used, one embodiment of the present invention makes use of three indicators and twenty-seven fuzzy logic rules. This number of indicators and rules insures that the correct, next available server can be quickly selected.

The present invention and its advantages can be best understood with reference to the drawings, detailed description of the invention and claims that follow.

BRIEF DESCRIPTION OF THE DRAWINGS

FIGS. 2A–D depict examples of sets of fuzzy logic rules according to embodiments of the present invention.

FIGS. 6A–D depict graphical illustrations of how selection indices may be generated according to one embodiment of the present invention.

DETAILED DESCRIPTION OF THE INVENTION

Figure 1:
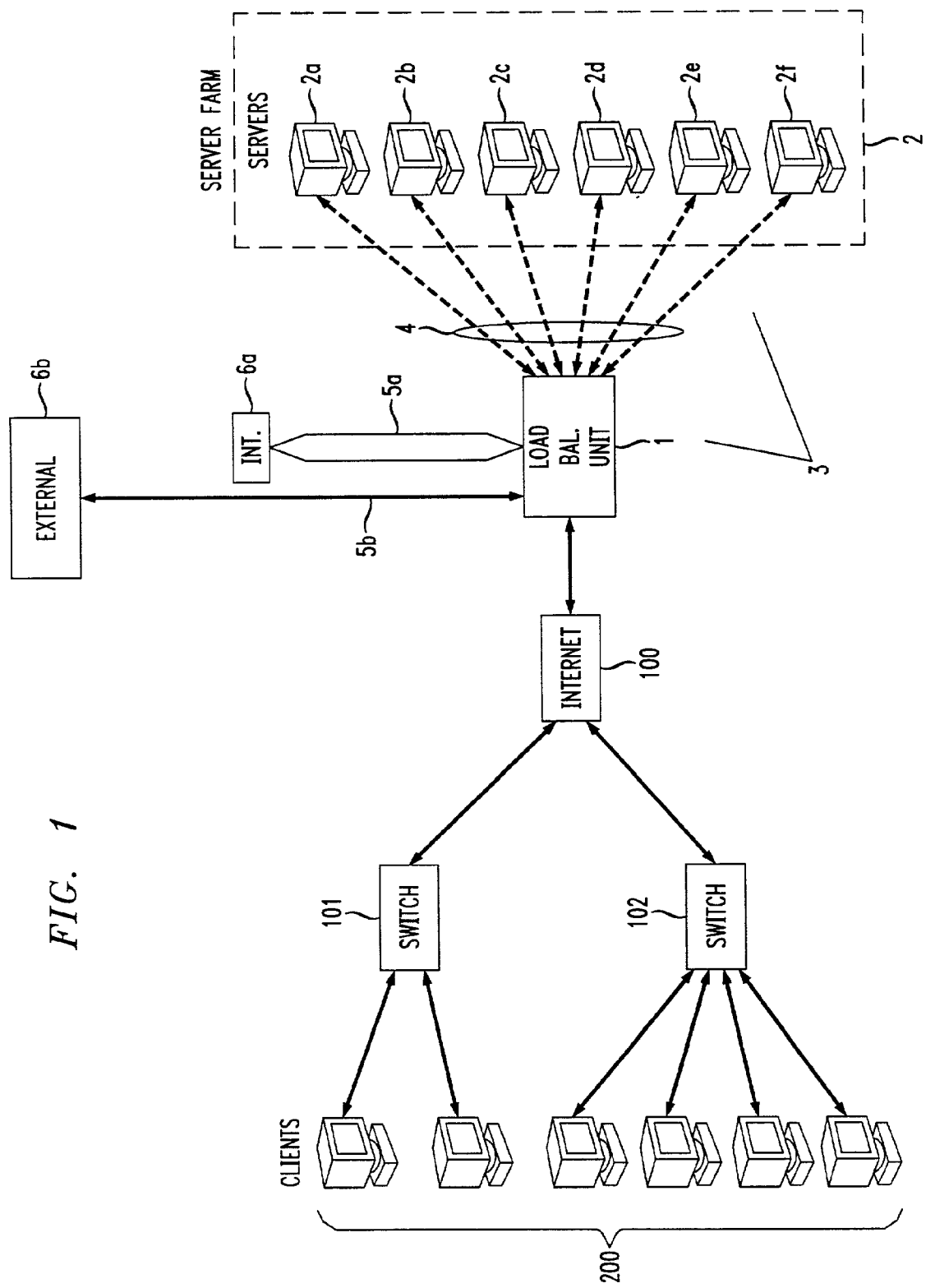
FIG. 1 depicts a simplified block diagram showing a load-balancing unit connected to a group of servers according to one embodiment of the present invention.

FIG. 1 depicts a server farm 2 connected to a load-balancing unit 1 or device (collectively referred to as a "unit"). The server farm 2 and unit 1 make up a network 3 which is connected to the Internet 100 or another similar network. The load-balancing unit 1 may comprise a load-balancing switch or router adapted to route traffic from the Internet 100 to a server 2a–2f (where "f" indicates the last server in the farm 2) within the server farm 2.

It should be understood that each of the individual servers 2a–2f is not "visible" to clients 200 (i.e., Internet users). That is, the only Internet protocol ("IP") address which is known to the clients 200 is the address of the load-balancing unit 1. As far as the clients 200 are concerned, their requests are being handled by unit 1. Though the unit 1 is connected to many servers 2a–2f, each client views the server farm 2 as a single server.

In addition, it should be understood that each server 2a–2f itself has a unique IP address. These addresses are only accessible by first accessing the unit 1. Each server 2a–2f within the server farm 2 is adapted to "listen" to, or monitor, the requests input into the load-balancing unit 1. It can be said, then, though each server 2a–2f has a unique IP address, each is adapted to monitor requests via a "common" IP address,—the address of the load-balancing unit 1.

In one embodiment of the present invention, the load-balancing unit 1 is adapted to apply "fuzzy" logic rules to a set of network-related indicators which are associated with each server 2a–2f. The network-related indicators may comprise information input into the load-balancing unit 1 from a server 2a–2f via a link 4 or may comprise a value generated by the unit 1 from such input (collectively referred to as "generated"). In one embodiment of the present invention the indicators comprise a set made up of response time ("RT"), a number of active connections ("NAC") and delivered throughput ("DT"). Upon generating this set of indicators, the load-balancing unit 1 is adapted to apply a set of fuzzy logic rules to these indicators.

Later on in this discussion the type of fuzzy logic rules that may be applied to the indicators will be described in more detail. For now, the description which follows will focus on the results of applying those rules.

The load-balancing unit 1 is adapted to apply the fuzzy logic rules to the indicators in order to determine which server 2a–2f to select. Greatly simplified, applying the fuzzy logic rules to the indicators RT, NAC, and DT provides a way for the load-balancing unit 1 to quickly and reliably determine which server 2a–2f is best suited to receive the very next request from clients 200.

It should be understood that any number of indicators or inputs can be used by balancing unit 1 in addition to the three mentioned above. However, the greater the number of indicators used the more time it takes for the balancing unit 1 to select the next available server 2a–2f. Other indicators which may be used comprise a "weighted percentage," a "round robin indicator," and/or a "CPU availability" indicator (CPU being an abbreviation for central processing unit), to name just a few.

As indicated above, one embodiment of the present invention makes use of RT, NAC, and DT indicators. The indicator RT indicates how fast a given server 2a–2f responds to a test signal sent from the load-balancing unit 1 to each server. Some of those skilled in the art may refer to this as "pinging" a server to test how fast it responds. More specifically, the load-balancing unit 1 is adapted to send out a signal to a server 2a–2f and to keep track of the time it takes for that server to respond to such a signal. In this manner, the load balancing 1 unit can estimate the amount of time it would take each server 2a–2f to respond to an actual request.

The second indicator, NAC, indicates the number of active connections each server 2a–2f is presently responding to. That is, when a request is forwarded from the balancing unit 1 to a server 2a–2f an active connection is established. Once a request has been forwarded to a server 2a–2f, the load-balancing unit 1 is adapted to count the number of active connections which have been established between the load balancing unit 1 and each server 2a–2f. The load-balancing unit 1 is not only adapted to count those connections which are established, it is also adapted to keep track of those connections which are terminated. The indicator NAC can be likened to a counter which allows the load-balancing unit 1 to keep track of a count which indicates the number of active or terminated connections being handled by each individual server 2a–2f.

The third indicator, DT, measures the "delivered throughput" a particular server is handling. For example, over a set period of time each server 2a–2f will transmit or send out a given amount of data. As is known in the art, the data typically sent by a server 2a–2f represents a "packet" of data. Within each packet, there is a data field which indicates the length of data (i.e., amount of data) making up the packet. More specifically, the load-balancing unit 1 can be adapted to detect each packet being sent by each server 2a–2f and can be further adapted to detect the amount of data contained in each packet. The balancing unit 1 is adapted to maintain a cumulative count of the amount of data being sent from each server 2a–2f Each server's cumulative count is used to generate an associated delivered throughput indicator, DT.

Once the balancing unit 1 has generated the indicators RT, NAC, DT, it then applies a set of fuzzy logic rules to each of the indicators. It should be understood that these rules are applied to each indicator associated with each server 2a–2f.

After applying the rules to the indicators, the balancing unit 1 is further adapted to generate a "selection index" ("SI") which is associated with each set of network-related indicators. Because each server 2a–2f will have associated with it a unique set of network-related indicators, the balancing unit 1 will generate a unique selection index for each server 2a–2f.

It should be further understood that the load-balancing unit 1 is adapted to apply the fuzzy logic rules to the indicators and to generate selection indices for each server 2a–2f in a real-time manner.

At a given instant of time, therefore, there exists within the load-balancing unit 1 a set of selection indices which are associated with servers 2a–2f. In one embodiment of the present invention, the balancing unit 1 is further adapted to direct a request from clients 200 to a server 2a–2f which is associated with one of the generated selection indices. More particularly, the load-balancing unit 1 is adapted to direct a request from a client 200 to a server 2a–2f which is associated with a "highest" selection index from among the generated selection indices.

For example, the highest selection index may be that index which indicates that a server 2a–2f is the best server to handle the very next request from clients 200. In some cases, this will be the server which has the fewest number of active connections, or the lowest delivered throughput, or the fastest response time or some combination of all of these features. Greatly simplified, the highest selection index may be associated with that server which is handling the least amount of traffic and is therefore capable of handling additional traffic, including the next request from clients 200.

It should also be realized that the balancing unit 1 and the servers 2a–2f shown in FIG. 1 are greatly simplified. Though shown as single, individual units, the balancing unit 1 and servers 2a–2f may comprise more than one unit or device. The fact that the balancing unit 1 or each server 2a–2f may comprise more than one device matters little to the present invention. As long as the balancing unit 1 and each server 2a–2f carries out the functions and features described above and below, it matters little to the present invention whether the balancing unit 1 or each server 2a–2f comprises one or more physical units.

It was stated above that the load-balancing unit 1 is adapted to apply the fuzzy logic rules to indicators on a real-time basis. It should also be understood that the indicators themselves comprise dynamic, time-dependent indicators. That is to say, that the value of each indicator is changing from one instant of time to another.

As indicated earlier, to be effective, any load-balancing device needs to be both quick and accurate. Realizing this, the present inventor selected only three network-related indicators; RT, NAC and DT. In addition, in an illustrative embodiment of the present invention, the present inventor envisions using 27 fuzzy logic rules. A smaller or greater number of rules may be used and still fall within the scope of the present invention provided the number is not so great that the response time of a load-balancing unit is sacrificed and not so small that accuracy is sacrificed. The present inventor selected 27 rules as an advantageous embodiment of the present invention because this number of rules provides a high level of accuracy and an acceptable response time.

In an illustrative embodiment of the present invention, the load-balancing unit 1 is adapted to apply the 27 fuzzy logic rules to each network-related indicator associated with each server 2a–2f. Though there is no preferred order in which each rule is applied to each network-related indicator, the present invention does require that each rule (no matter what the number of rules) be applied to each network-related indicator.

Up until now, it has been assumed that the hardware/software for carrying out the features and functions described above (and below) resided solely within the load-balancing unit 1. This in fact may be the case. The present invention envisions units 1 which comprise programmed devices/mediums (e.g., microprocessors, digital signal processors, memory cards, tapes, floppy disks, CDs, etc . . . ), memory, other electronic devices or some combination of the above for carrying out all of the features and functions described above and below. The invention is not limited, however, to such embodiments. Instead, the present invention also envisions embodiments where a program or data/instructions comprising code adapted to carry out some or all of the features and functions described above (and below) are sent from an internal source 6a via bus 5a or from an external source 6b via connection 5b to unit 1.

Said another way, the load-balancing unit 1 may be first adapted to receive a program or data/instructions (collectively referred to as "download") from another source, further adapted to store this download, and then finally adapted to execute the contents of this download to carry out the features and functions of the present invention.

We now turn to a discussion of how the 27, fuzzy logic rules are applied to the network-related indicators in order to generate the selection indices which are ultimately used to select a server 2a–2f from among the server farm 2. For reference, the 27 fuzzy logic rules mentioned above are shown in FIGS. 2A–D.

In an illustrative embodiment of the present invention, the load-balancing unit 1 is further adapted to convert the real-world value of each network-related indicator to a "fuzzy logic" or so-called "fuzzified" value.

The details of how real-world values are converted to fuzzified values are known in the art and will not be repeated here.

Once the unit 1 has converted the real-world values for each indicator (RT, NAC, DT, etc.) to fuzzified values, unit 1 must then apply each of the 27 rules to each fuzzified value.

Figure 3:
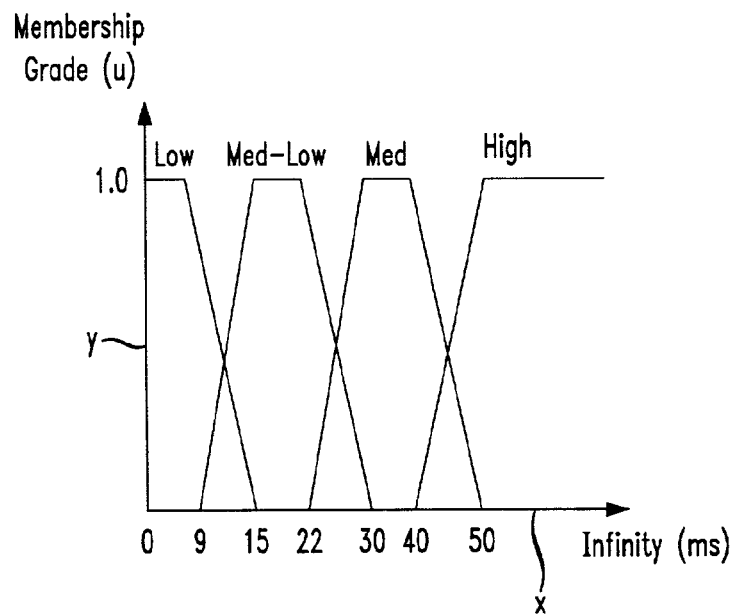
FIG. 3 depicts a reference graph used to correlate fuzzified values associated with a "round-trip" network-related indicator to a range of possible values according to one embodiment of the present invention.

FIG. 3 depicts an example of a reference graph which corresponds to a single reference fuzzy logic rule used to correlate fuzzified RT values to a range of possible RT values.

Referring to FIG. 3, a range of possible RT indicator values from 0 to infinity (in milliseconds "ms") are shown on the horizontal axis, x. The range of possible RT input values along the x-axis is known as the "Universe of Discourse" ("UoD") for the indicator, RT. FIG. 3 also shows an example of some y-axis ranges. Depending on where the actual RT fuzzified value falls along the x-axis (i.e., depending on what the RT value is), it may correspond to a "Low", "Med-Low", "Med" or "High" y-axis range. The y-axis ranges are referred to as "Membership Grades". In an illustrative embodiment of the present invention, the Membership Grade, y-axis ranges, indicate how closely an actual fuzzified value (RT in FIG. 3) correlates to the range of possible fuzzified values. Said another way, the Membership Grade is a measurement of how closely an actual fuzzified value correlates to a fuzzy logic rule. The closer the correlation, the higher the Membership Grade. So, an actual value may have a "Low", "Med-Low", "Med" or "High" correlation with a given rule according to the example shown in FIG. 3. For example, an actual fuzzified RT value of 35 ms correlates to a Med (i.e., medium) Membership Grade, a value of 65 ms correlates to a High Membership Grade, while a value of 45 ms correlates to a Med or a High Membership Grade.

Figure 4:
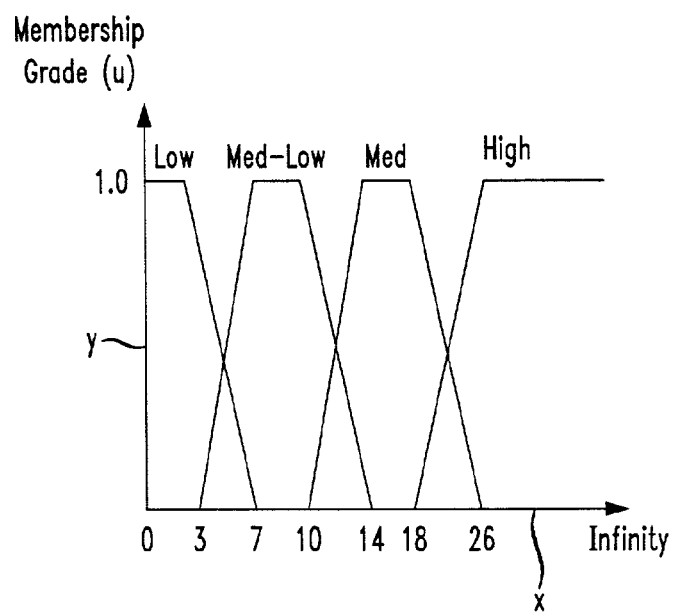
FIG. 4 depicts a reference graph used to correlate fuzzified values associated with a "number of active connections", network-related indicator to a range of possible values according to one embodiment of the present invention.
Figure 5:
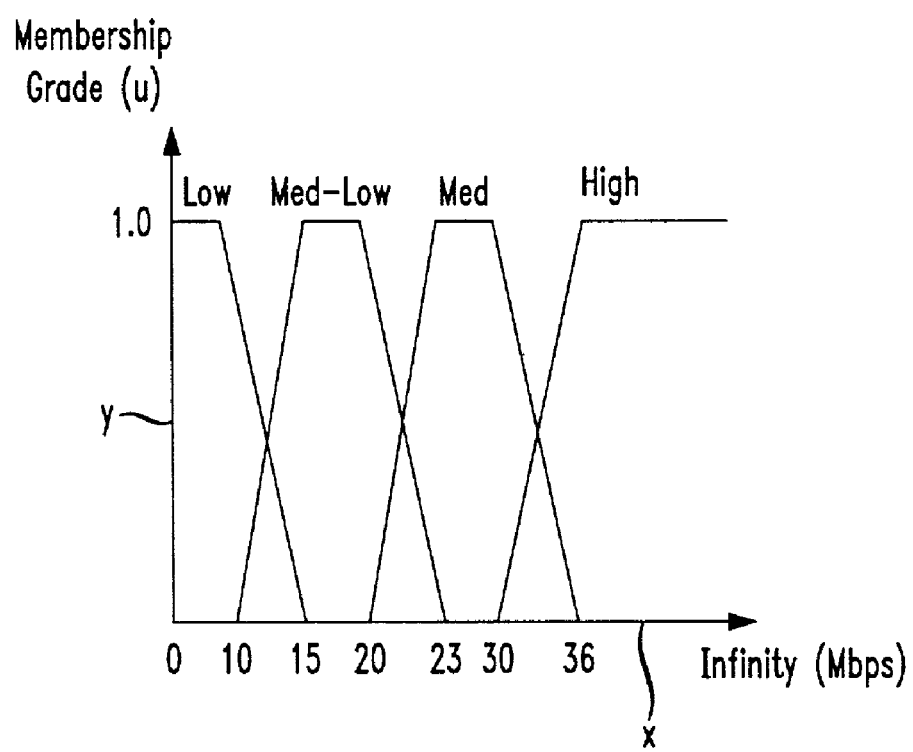
FIG. 5 depicts a reference graph used to correlate fuzzified values associated with a "delivered throughput" network-related indicator to a range of possible values according to one embodiment of the present invention.

Similarly, FIG. 4 depicts an example of another reference graph used to correlate fuzzified NAC values to a range of possible NAC values and FIG. 5 depicts an example of a reference graph used to correlate fuzzified DT values to a range of possible DT values.

In an illustrative embodiment of the present invention, the unit 1 is adapted to compute an "area" associated with each correlation for each server 2a–2f.

To explain further, the unit 1 is adapted to generate separate areas for each of the 27 rules by correlating the fuzzified input values for indicators RT, NAC and DT to each rule using graphs similar to those in FIGS. 3–5. The contributions from all the rules are combined into an "aggregate" area. These areas are used to generate the selection index for each server 2a–2f. More specifically, in an illustrative embodiment of the present invention, the load-balancing unit 1 is further adapted to locate the "center of gravity" ("CoG") of this aggregate area. This CoG comprises the selection index for a given server 2a–2f.

A graphical example depicting how a selection index for a set of 3 rules (instead of 27) is shown in FIGS. 6A–D. It should be understood that a similar procedure applies for the calculation of SI values involving 27 rules. The 3 rules for this sample calculation are randomly chosen from the rules shown in FIGS. 2A–D.

Referring to FIG. 6A, the unit 1 is adapted to locate the intersection "Q" of a fuzzified RT value 400 (x-axis) and a graph "P" associated with RT in Rule 1, where the graph P is known in the art. Similarly, the unit 1 is adapted to locate the intersection point "R" and "S" associated with the intersection of fuzzified inputs 401, 402 for each indicator, RT, NAC and DT.

After locating the intersection points for each indicator input values 400–402, the unit 1 is further adapted to generate an "area" for Rule 1. FIG. 6A depicts one way in which the unit 1 generates such an area.

Referring back to FIG. 6A, a vertical line 500-502 is extended from each intersection point Q, R, and S towards a graph B (where B is also known in the art), farthest to the right of FIG. 6A. Each vertical line intersects graph B at a certain point. The area underneath each point represents the area contributed by each indicator value, RT, DAC and DT. As illustrated by the shaded area A1 in FIG. 6A, in an illustrative embodiment of the present invention, the unit 1 is adapted to select the area below the lowest vertical line.

Figure 6C:
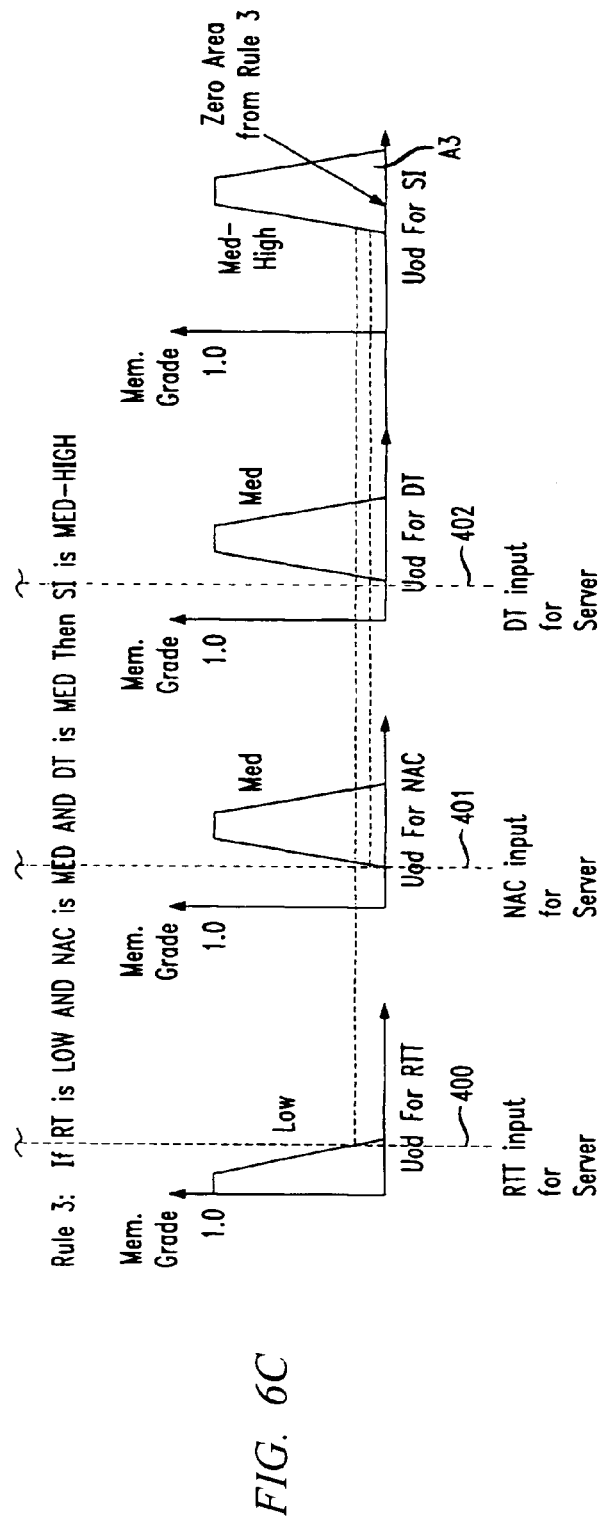

This process is repeated for Rules 2 and 3 in FIGS. 6B and 6C. Each time, an area A2/A3 is generated by selecting the area associated with a lowest vertical line. Each of these areas A1–A3 is referred to as the area "contributed" by each Rule. Note that the area contributed by Rule 3 in FIG. 6C is zero. Once each Rule's contribution has been generated, the unit 1 is adapted to generate an aggregate area from each of the areas, in this case from areas A1, A2, and A3.

Figure 6D:
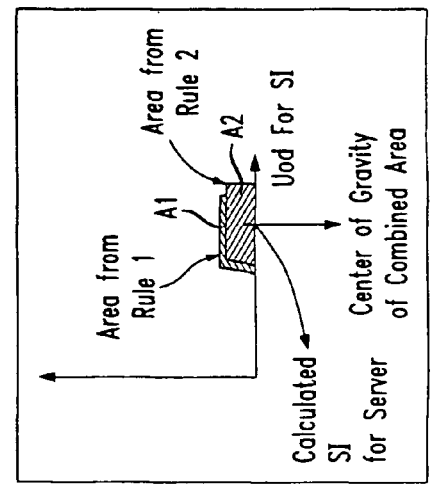

As graphically illustrated in FIG. 6D, the load-balancing unit 1 is adapted to combine the contributions (i.e., areas A1 and A2, where A3=0) from each rule and to generate an aggregate area. The unit 1 is then further adapted to locate the CoG of the aggregate area. This CoG gives the selection index for a particular server given a current set of indicator values and rules. The selection indices for all servers 2a–2f in the farm 2 are generated in this manner.

The selection indices for the servers 2a–2f of the farm 2 may be stored and compared in the unit 1. In one embodiment of the invention, upon receiving a next request from clients 200, unit 1 is adapted to direct the request to a server 2a–2f having the highest selection index. This server is the "next available server".

The process of generating selection indices may be repeated after each request. Each time, the process may result in the same or different server 2a–2f being selected depending upon each server's real-time selection index.

It should be noted that the load balancing unit 1 may comprise a relatively large device, such as a switch or router as well as a small device, such as a programmed medium (e.g., one or more floppy disks, magnetic tapes, optical CDs, microprocessors, digital signal processors, memory or the like). When the unit 1 comprises a programmed medium of some sort, the medium may comprise a program written in a form known in the art, such as C or C++, to give just two examples. The program in turn may comprise program code adapted to carry out the features and functions of the present invention.

It should be understood that changes and variations may be made without departing from the spirit and scope of the present invention as defined by the claims that follow.

The invention claimed is:

1. A load-balancing unit configured to apply each fuzzy logic rule of a plurality of fuzzy logic rules to each value of sets of fuzzified, dynamic values indicating network traffic flow, to generate an area associated with each fuzzy logic rule and an aggregate area from a combination of areas associated with the fuzzy logic rules, and to generate a selection index from a center of gravity of the aggregate area for each of the sets, wherein the apply is performed independent of the values.

2. The unit as in claim 1 wherein the unit comprises a load balancing switch.

3. The unit as in claim 1 wherein the unit comprises a load balancing router.

4. The unit as in claim 1 wherein the unit comprises a programmed media.

5. The unit as in claim 1 further configured to direct a request to a server associated with one of the generated selection indices.

6. The unit as in claim 5 further configured to direct a request to a server associated with a highest selection index.

7. The unit as in claim 1 wherein each of the indicator values represents a dynamic operating status of a server.

8. The unit as in claim 7 wherein the server is one of multiple servers grouped together to form a server farm and each of the sets of indicator values is uniquely associated with one of the multiple servers.

9. The unit as in claim 8 wherein the server farm is for providing service for incoming requests of an Internet Service Provider and one of the multiple servers is selected to provide service for one of the incoming requests based on the selection index associated therewith.

10. The unit as in claim 1 wherein the indicator values comprise values associated with a response time, a number of active connections and a delivered throughput.

11. A method for selecting Internet servers comprising:
applying each fuzzy logic rule of a plurality of fuzzy logic rules to each value of sets of fuzzified, dynamic values indicating network traffic flow, wherein the applying is independent of the values;
generating an area associated with each fuzzy logic rule;
generating an aggregate area from a combination of areas associated with the fuzzy logic rules; and
generating a selection index from a center of gravity of the aggregate area for each of the sets.

12. The method as in claim 11 further comprising directing a request to a server associated with one of the generated selection indices.

13. The method as in claim 12 further comprising directing a request to a server associated with a highest selection index.

14. The method as in claim 11 wherein each set of the indicator values represents a dynamic operating status of a server.

15. The method as in claim 11 wherein each of the fuzzy logic rules contribute to a calculation of the selection index for each set.

16. The unit as in claim 11 wherein the method further comprises selecting a server from a server farm based on the selection indexes to provide a requested service.

17. The method as in claim 11 wherein the indicator values comprise values associated with a response time, a number of active connections and a delivered throughput.

* * * * *